United States Patent [19]

Coeckelberghs et al.

[11] Patent Number: 4,752,461
[45] Date of Patent: Jun. 21, 1988

[54] PROCESS AND APPLIANCE FOR THE PRODUCTION OF GASEOUS PRODUCTS BY DECOMPOSITION OF LIQUIDS

[75] Inventors: Paul Coeckelberghs, Sint-Pieters-Leeuw; Willy Depoorter, Brussels, both of Belgium

[73] Assignee: Interox (Société Anonyme), Brussels, Belgium

[21] Appl. No.: 843,998

[22] Filed: Mar. 25, 1986

Related U.S. Application Data

[62] Division of Ser. No. 624,703, Jun. 26, 1984, Pat. No. 4,601,884.

[30] Foreign Application Priority Data

Jun. 27, 1983 [FR] France ............................ 83 10714

[51] Int. Cl.$^4$ ............................................ C01B 13/00
[52] U.S. Cl. ...................................... 423/579; 423/659
[58] Field of Search ........................... 423/579, 659

[56] References Cited

U.S. PATENT DOCUMENTS

| | | | |
|---|---|---|---|
| 2,721,788 | 10/1955 | Schad | 423/579 |
| 3,035,888 | 5/1962 | Massey | 423/659 |
| 3,607,066 | 9/1971 | Basch et al. | 423/579 |
| 3,882,223 | 5/1975 | Reinhardt | 423/579 |
| 3,887,696 | 6/1975 | Bernard et al. | 423/579 |
| 3,917,461 | 11/1975 | Kühl et al. | 423/579 |
| 4,439,411 | 3/1984 | Manganaro | 423/561 A |

FOREIGN PATENT DOCUMENTS

| | | | |
|---|---|---|---|
| 0007118 | 1/1980 | European Pat. Off. | |
| 1188866 | 8/1961 | Fed. Rep. of Germany | 423/584 |
| 2172245 | 9/1973 | France | |

*Primary Examiner*—John Doll
*Assistant Examiner*—Wayne A. Langel
*Attorney, Agent, or Firm*—Spencer & Frank

[57] ABSTRACT

A continuous process for the production of a gaseous product (12), and as a liquid byproduct (16), at the same time by reacting a liquid reagent in a reactor (4) is disclosed. The positive difference between the pressure at the entrance to and an pressure at the outlet of the reactor (4) is kept constant. The process can be used to generate oxygen by decomposition of hydrogen peroxide and this oxygen can be used in welding and cutting sets.

16 Claims, 5 Drawing Sheets

PROCESS AND APPLIANCE FOR THE PRODUCTION OF GASEOUS PRODUCTS BY DECOMPOSITION OF LIQUIDS

This is a division of application Ser. No. 624,703 filed June 26, 1984 now U.S. Pat. No. 4,601,884.

BACKGROUND OF THE INVENTION

1. Field of the Invention

The present invention relates to a process for the production of gaseous products by decomposition of liquids. It relates more particularly to a process for the production of oxygen by decomposition of hydrogen peroxide. It also relates to an appliance for implementing said process.

2. Background of the Art

The utilisation of gaseous oxygen usually requires the use of storage tanks that must be kept under pressure, which entails relatively complicated, expensive and cumbersome equipment. These drawbacks are sometimes prohibitive. This is the case when oxygen is destined to be used as an oxidising agent in portable welding or cutting sets.

Consequently, it was proposed in European Patent Application EP-A-No. 0 007 118 filed on 18th April 1979 in the name of B.B.R. Instruments that oxygen be generated by catalytic decomposition of hydrogen peroxide in a particular appliance. This appliance, although very effective, has certain disadvantages. For example, the flow of oxygen and the efficiency decrease gradually over time and the performance of the appliance varies considerably depending on the origin of the hydrogen peroxide solution used. Moreover, the heat released by the decomposition of hydrogen peroxide is expelled with difficulty and the oxygen formed contains appreciable quantities of water vapour which is detrimental to the stability and the temperature of the torch flame. Finally, the design of the appliance involves maintaining a not inconsiderable dead volume of aqueous peroxide solution in the storage tank.

SUMMARY OF THE INVENTION

This invention relates to a continuous process for the production of a gaseous product by reaction of a liquid reagent. The liquid reagent is introduced continuously into a reactor in order to obtain a gaseous product and a light product. The process is conducted so as to maintain the positive difference between the pressure at the entrance to the reactor and the pressure at the outlet of the reactor constant.

Figure 1:
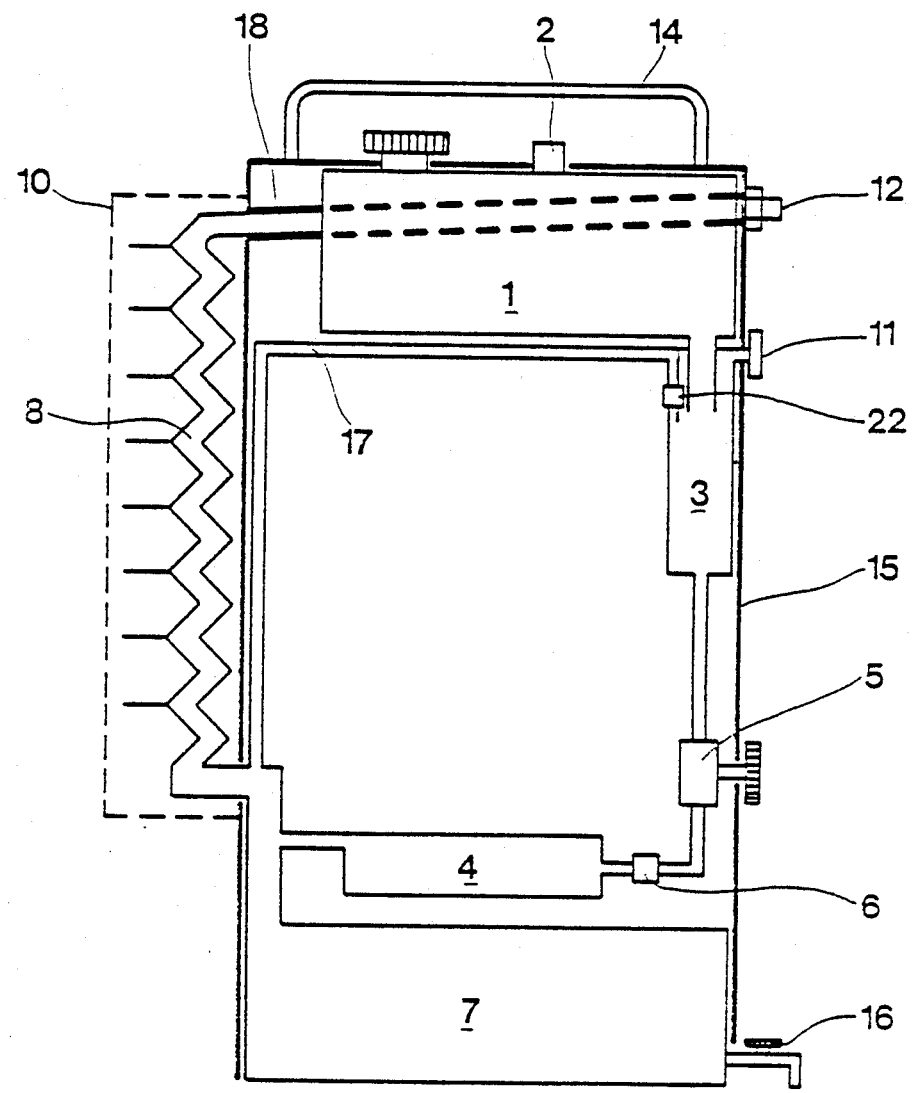
FIGS. 1 and 2 illustrate sideview cross-sections of the apparatus according to the invention.

The present invention aims to provide a process and an appliance for generating a gaseous product such as oxygen by decomposition of a liquid such as hydrogen peroxide which do not have the disadvantages of the known processes and appliances. For example, the process according to the invention thus enables gaseous oxygen to be generated in an approximately constant flow without catalyst deactivation being observed and without the process being dependent upon the quality of the hydrogen peroxide solution. It also enables gaseous oxygen to be obtained at a sufficient pressure for it to be utilised notably as an oxidising agent in a welding set. Finally, the process according to the invention can, if necessary, be used without recourse to another external source of energy.

The appliance used to carry out the process according to the invention can be self-contained and portable. It can, if necessary, have very small external dimensions and thus be easy to handle. Moreover, its use does not involve any risk. If the apppliance according to the invention is used to generate oxygen destined to be employed as an oxidising agent in welding sets, very hot and very stable flames are obtained.

To this end, the present invention relates to a continuous process for obtaining a gaseous product by reaction of a liquid reagent according to which the liquid reagent is introduced continuously into a reactor in order to obtain a gaseous product and a liquid product and in which the positive difference between the pressure at the entrance to the reactor and the pressure at the outlet of the reactor is kept constant.

The process according to the invention is particularly advantageous when the reaction requires the use of solid particles at the reaction temperature, serving for example as a reagent or catalyst, which are placed in the reactor. Good results have been obtained when the reactor contains solid particles of catalyst.

DESCRIPTION OF THE PREFERRED EMBODIMENTS

The term liquid reagent is intended to mean a reagent or a mixture of reagents which are themselves liquid or which are in the form of a solution in at least one suitable solvent at the temperature at which they enter the reactor. Generally, the term is intended to mean reagents which are liquid or in the form of a solution at ambient temperature. If the liquid reagent is in the form of a solution in a solvent, the solvent is chosen from those that are inert with respect to the reaction and which are capable of dissolving at least 5% and preferably at least 10% of their weight of reagents. Good results have been obtained with liquid reagents in the form of a solution in a solvent. Generally, a solvent which dissolves less than 10% of the gaseous product at ambient temperature is chosen. An example of a suitable solvent is water.

The term gaseous product is intended to means a product or a mixture of products which are gaseous at ambient temperature and which are formed by reaction of liquid reagents.

The term liquid product is intended to mean a product or a mixture of products which are in liquid form at ambient temperature. It may be a product formed by the reaction which is itself liquid, a liquid solvent or a solution in at least one solvent in which the product formed by the reaction and possibly the unconverted reagent are dissolved.

The term positive difference between the pressure at the entrance to the reactor and the pressure at the outlet of the reactor is intended to mean the difference in pressure that is present when the levels of the liquid reagent at the entrance to the reactor and of the liquid product at the outlet of the reactor are the same, that is, in the case of a reactor placed in a horizontal position. If these levels at the entrance and the outlet are different, this pressure difference is corrected by a value equal to the pressure corresponding to the weight of a column of liquid reagent the height of which is equal to the difference in level between the entrance of the liquid reagent and the outlet of the liquid product, this correction being positive when the entrance of the liquid reagent is at a lower level than that of the outlet of the liquid produce, and negative when the converse is true.

The difference in pressure between the entrance and the outlet of the reactor, provided that it is constant throughout the period when the process according to the invention is being carried out, can nevertheless be adjusted to different values depending on the nature and composition of the liquid reagents, the reactors used (shape, filling, pressure drop etc) and depending on the shape and dimensions of the solid bodies such as catalysts that may be placed in the reactor.

Generally, in the case of a reactor placed in a horizontal position, the difference in pressure between the entrance and the outlet of the reactor is at least 0.0001 MPa and preferably at least 0.003 MPa. It can have much higher values but, from a practical point of view, it does not generally exceed 0.05 MPa and preferably 0.01 MPa. Generally, care is taken to ensure that the difference in pressure varies by less than 20% and preferably by less than 10% during operation.

The pressure of the gases produced by the process according to the invention can be variable. The absolute pressure is generally at least 0.1001 MPa and most often at least 0.101 MPa. Generally, for practical reasons, it does not exceed 1 MPa and preferably 0.6 MPa. Of course, these values depend conventionally on the flows of liquid reagent passed to the reactor and on the size of the reactor.

Various methods can be used to keep the difference in pressure between the entrance and the outlet of the reactor constant. For example, it is possible to use an intermediate constant level tank to feed the liquid reagent. This tank is placed in such a way that the level of the liquid reagent is situated at a higher level than that of the entrance to the reactor and the top of this tank is brought into contact with the gaseous phase collected at the outlet of the reactor. In this case, the difference in pressure between the entrance and the outlet of the reactor is ensured by the weight of the column of liquid reagent in the intermediate tank.

This very simple method is particularly advantageous because it obviates the need for external sources of energy.

A constant difference in pressure between the entrance and the outlet of the reactor can also be ensured with the aid of a pump with which it is possible to regulate the operating pressure. In this case, the pressure at the outlet of the reactor is measured with a pressure gauge and the pressure at the entrance to the reactor is regulated accordingly with the aid of the pump. An adjustment of this kind can be made manually or automatically by any method known in itself.

Various types of reactors can be used to carry out the reaction. It is preferable to use reactors in which the liquid reagent flows horizontally. It is thus possible to use one or more tubular reactors placed horizontally in which the solid particles involved in the reaction can be placed. If the solid particles are consumed or gradually deactivated by the reaction, it is advantageous to place them in cartridges the walls of which are provided with openings so as to allow the liquid reagent to flow through the cartridge. If the solid particles are consumed or deactivated, these cartridges are simply replaced.

It is possible to use conpletely or partially submerged reactors. It is advantageous to provide, in the upper part of the reactor, a zone which is not submerged, which does not contain any solid particles involved in the reaction and in which the gaseous product can be released.

This technique allows the gaseous product to be removed as it is formed by the reaction. A technique such as this has numerous advantages. It allows the conversion rate to be increased because one of the products of the reaction leaves the reaction medium and because contact between the liquid reagent and the solid particles is better when the gaseous product formed is removed.

Moreover, as the reaction simultaneously generates a gaseous produce and a liquid product, the two products formed are thus separated immediately and can, if necessary, be collected in separate places.

Moreover, if the reaction is exothermic, the non-submerged zone of the reactor can be provided with heat exchange apparatus to prevent the liquid product formed evaporating completely and to control the temperature of the gaseous product formed.

Depending on the type of reactor used, it is therefore possible to collect either a mixture of gaseous and liquid products which can take the form of a single gaseous phase if its temperature is sufficiently high or the form of a mixture of vapours and liquids, or to collect separately a gaseous phase comprising essentially the gaseous product and a liquid phase comprising essentially the liquid product.

If the reaction is exothermic, it is important to provide a system for removing effective heat. If necessary, the products collected at the outlet of the reactor can be passed to a condensation zone or a cooling zone. These generally comprise at least one heat exchanger and at least one liquid separator. It is possible to use various types of heat exchangers known in themselves and comprising heat exchange surfaces of all types such as plates, coils etc. It is also possible to use exchangers with one or more stages. The reaction products can advantageously be passed to one or more tubes of small cross-section and long length and possibly fitted with plates, blades etc to improve heat exchange which are cooled by simple contact with the surrounding air. Various items of equipment known in themselves can be used as liquid separators, such as droplet removers.

The process according to the invention can be used to carry out various reactions in which a liquid reagent is used to obtain a gaseous product and a liquid product. It is particularly suitable for obtaining oxygen by catalytic decomposition of hydrogen peroxide. In this case, an aqueous solution of hydrogen peroxide is introduced into a reactor containing solid particles of a hydrogen peroxide decomposition catalyst in order to form a mixture containing oxygen and water vapour, the mixture thus obtained is cooled in a condensation zone so as to form a gaseous phase containing essentially oxygen and a liquid phase containing essentially water which is removed and the positive difference between the pressure of the aqueous solution of hydrogen peroxide at the entrance to the reactor and the pressure of the gaseous phase containing essentially oxygen in the condensation zone at the outlet of the reactor is kept constant.

The oxygen formed in the process according to the invention is generally purified before being used. To this end, the mixture collected at the outlet of the reactor is cooled in a condensation zone so as to remove the water formed by the reaction. This mixture is thus passed to a heat exchanger and a water separator.

If the reactor is small in size and the oxygen flows are not too high, the mixture emerging from the reactor can be passed to a vessel equipped with a draining cock which will act both as a heat exchanger and a water separator. This vessel is generally situated at the same level as or at a lower level than that of the reactor such that the condensed water can be removed by gravity. Most often, this vessel is situated beneath the reactor. An additional heat exchanger is often placed on the oxygen outlet pipe in order to remove the final traces of water vapour entrained by the oxygen. The use of an additional heat exchanger is particularly useful if the oxygen is destined to feed a welding set because it prevents formation of water droplets which would be flung into the torch flame.

The aqueous solutions of hydrogen peroxide used can have variable concentrations. Generally, solutions containing 10 to 75% and most often 15 to 65% by weight hydrogen peroxide are used. Good results are obtained with concentrated commercial solutions which generally contain approximately 35% by weight hydrogen peroxide. The solutions of hydrogen peroxide can, if necessary, contain various customary additives. They can for example contain stabilisers known in themselves such as phosphoric or phosphonic acid and their derivatives such as their salts and more particularly sodium pyrophosphate or acid sodium pyrophosphate. They can also contain corrosion inhibitors and passivating agents known in themselves such as ammonium nitrate or sodium stannate. They can also contain anti-foaming agents.

To effect the decomposition of hydrogen peroxide to water and oxygen various types of catalysts known for this purpose can be used. It is thus possible to use elements of periods 4, 5 and 6 of groups $1b$, $2b$, $4a$, $5a$, $6a$ and $b$, $7a$ and $b$, and 8 of the International Classification of the elements and their derivatives. Good results have been obtained with catalysts based on metals such as gold, silver, platinum, palladium, manganese, iron, chromium, copper, cobalt and lead and their derivates such as their oxides and their salts. Advantageous results have been obtained with catalysts based on lead, platinum or palladium and their derivatives. Platinum has given excellent results. Other catalysts known in themselves can also be used and it is possible to use mixtures of different catalysts.

The catalysts can be placed as such in the reactor or they can be placed on suitable supports known in themselves. They can be deposited on the supports either physically or chemically. Various supports can be used. It is thus possible to use supports chosen from silicas, aluminas, alumino-silicates, activated charcoal, pumice stone, zeolites, bentonites, carborundum, diatomaceous earths, fullers earth and porous metal supports. Supports with good heat resistance and good mechanical resistance which do not undergo attrition and which do not shatter due to the effect of the pressure generated by the formation of the gaseous product in the pores of the support are generally chosen. The supports must also be chemically resistant to the reagents used and the products formed.

Goods results have been obtained with supports chosen from the aluminas, silicas and alumino-silicates.

Platinum deposited on alumina in a quantity of 1% of its weight has given excellent results during the decomposition of hydrogen peroxide.

The catalyst particles can take various forms. It is thus possible to use bars, tablets, extrudates, granules or spheres. Generally, in order to avoid pressure drops, particles more than 0.05 cm in size and most often more than 0.1 cm in size are used. Generally, their greatest size does not exceed 20 cm without this limit being critical.

If the process according to the invention is applied to the production of oxygen by decomposition of hydrogen peroxide, the various parts of the appliance used for this purpose which are in contact with hydrogen peroxide, possibly in the form of traces, are made advantageously out of materials which are resistant to corrosion by hydrogen peroxide. Aluminium, glass and certain polymers such as polypropylene, polytetrafluoroethylene, polyethylene, poly-1,1-difluoroethylene etc are suitable for this purpose.

The process according to the invention can be used to generate oxygen suitable for various uses. It can, for example, be used to generate oxygen for portable welding sets, to generate oxygen for inhalers enabling the air to be enriched with oxygen in variable quantities generally between 28 and 50% and most often Between 25 and 40% by weight oxygen and also to generate oxygen for fuel cells.

The invention also relates to a process for generating oxygen for the production of flames suitable for welding or cutting.

The invention also relates to appliances suitable for the production of gaseous products according to the process of the invention and comprising a device for keeping constant the positive difference between the pressure at the entrance to the reactor and the pressure at the outlet of the reactor.

In a self-contained appliance, a storage tank for the liquid reagent placed at a high level feeds an intermediate tank with a constant level; the latter feeds a reactor placed in a horizontal position and packed with solid particles by means of a line comprising an adjustable flow valve and a non-return valve for the contents of the reactor; the reactor is situated at a level below the constant level of the intermediate tank; a line links the outlet of the reactor to a vessel comprising a means of discharge; two lines connect the top of the vessel respectively with the top of the intermediate tank by a pressure equalising pipe comprising a non-return valve for the contents of the intermediate tank and with a heat exchanger which is itself linked to the outlet of the appliance.

In another appliance, a storage tank for the liquid reagent feeds, by means of a line comprising an adjustable pressure pump, a reactor placed in a horizontal position and packed with solid particles; a line links the outlet of the reactor to a vessel comprising a means of discharge; two lines connect the top of the vessel respectively to a pressure gauge which enables the adjustable pressure pump to be regulated, and to a heat exchanger which is itself connected to the outlet of the appliance.

The vessel comprising a means of discharge such as a cock can be situated at different levels. Generally it is situated at a level equal to or lower than and preferably lower than that of the reactor.

Figure 2:
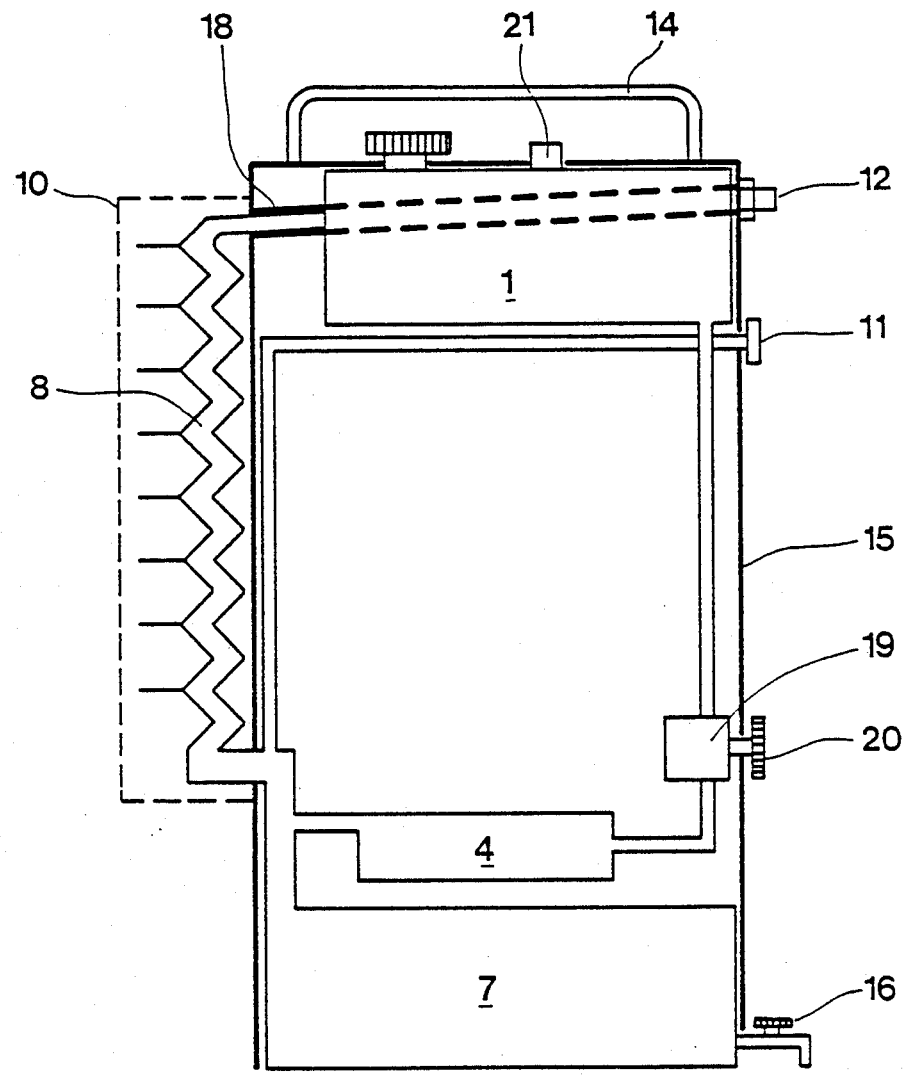

The process according to the invention can advantageously be carried out in sets of equipment such as those represented in FIGS. 1 and 2 which represent different ways of carrying out the process according to the invention.

FIG. 1 represents an appliance suitable for the production of a gaseous product by catalytic decomposition of a liquid reagent which comprises a small intermediate feed tank 3 with a constant level fed by storage tank 1. A safety valve 2 is placed in the storage tank. Reactor 4 in which the decomposition catalyst is placed is fed with liquid reagent by means of an adjustable flow valve 5. A non-return valve 6 placed between the reactor and the regulating valve prevents the pressure generated in the reactor from forcing the liquid reagent back upstream. The liquid product formed by the decomposition reaction of the liquid reagent is collected in vessel 7. A draining cock 16 enables the liquid product to be drawn off. The gaseous product formed by decomposition of the liquid reagent passes to a heat exchanger 8 in which the liquid product entrained by the gaseous product is condensed. A grille 10 protects the heat exchanger. The gaseous product passes to an insulated line 18 and leaves at 12. The pressure between the outlet of the reactor and the top of intermediate feed tank 3 is equalised by means of line 17. A non-return valve 22 separates line 17 from the intermediate feed tank 3 in order to prevent the liquid reagent passing from tank 3 to line 17. A gauge 11 enables the pressure to be regulated. The appliance is placed in a case 15 with a handle 14. FIG. 1 also shows the reactor inlet zone 35, the reactor outlet zone 36, and the hollow conduit 37 connecting the top of vessel 7 with the heat exchanger 8 and the apparatus outlet 12.

The method of carrying out the process represented in FIG. 1 is particularly advantageous because it does not require any external source of energy and is thus completely self-contained.

In the appliance shown in FIG. 2, the feed by means of an intermediate constant level tank of FIG. 1 has been replaced by an adjustable pressure pump 19 which enables the pressure to be adjusted by means of pressure switch 20. Storage tank 1 is vented at 21. FIG. 2 also shows the hollow conduit 38 connecting adjustable pump 19 at its suction end to storage tank 1, and at its discharge end through reactor inlet zone 35, to reactor 4. In addition, the pressure measuring device 11 is shown as being connected by a hollow conduit 39 to the upper part of vessel 7.

The sets of equipment represented in FIGS. 1 and 2 can also be used to cause a liquid reagent to react with particles of solid reagent. In this case, the particles of solid reagent are placed in reactor 4.

Figure 3:
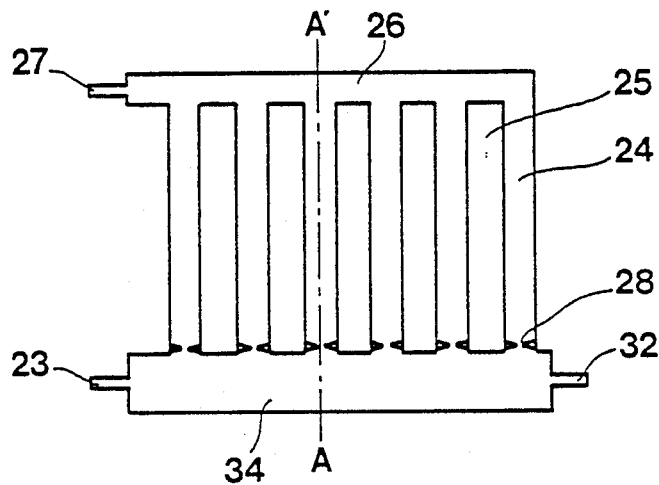
FIGS. 3 and 4 illustrate a sideview and cut-away end view of the reaction zone, vertical conduit and gas collection zone reactor configuration, which aids in the separation of the gaseous product from liquid medium.
Figure 4:
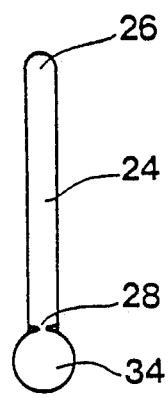
Figure 5:
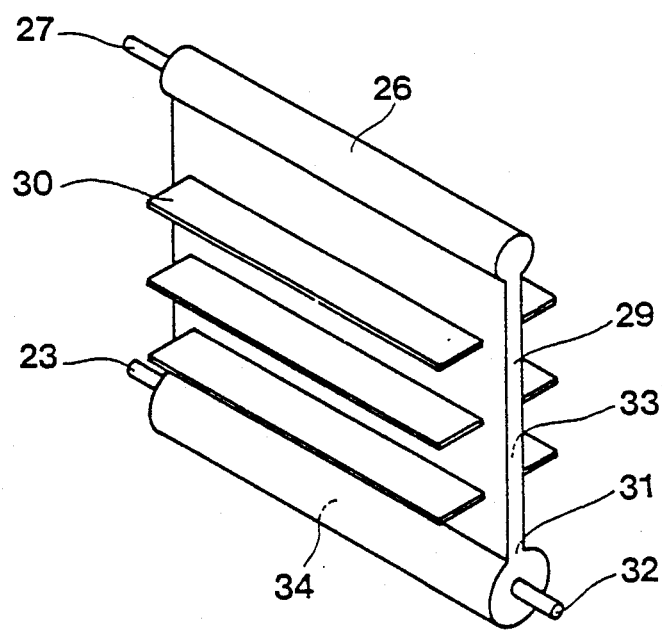
FIG. 5 is an isometric view of the exterior showing the reactor connected to an upper horizontal vessel through a conduit having cooling vanes mounted thereon.

The process according to the invention can advantageously be carried out in reactors such as those represented in FIGS. 3 to 5.

FIG. 3 represents a sectional view of a reactor. The liquid reagent enters via line 32 into reaction zone 34 where the solid partciles of catalyst or of reagent are placed. The gaseous product is liberated via vertical tubes 24 placed in the upper part of the reaction zone. The gaseous product is collected in horizontal pipe 26 and caught in 27. Necks 28 are provided for at the bottom of the vertical pipes to prevent the solid particles of catalyst or reagent being entrained in said pipes. The liquid product leaves the reactor at 23. Spaces 25 between the pipes ensure heat exchange.

FIG. 4 represents a side view in section along the plane AA' of FIG. 3.

FIG. 5 represents a perspective view of another reactor. The liquid reagent enters via line 32 into reaction zone 34 where the solid partciles of catalyst or reagent are placed. The gaseous product is released via the horizontal slit 31 placed in the upper part of the reaction zone and passes through chamber 33 acting as a heat exchanger and closed at the ends by walls 29. The side walls of this exchanger are provided with blades 30. The gaseous product is collected in horizontal pipe 26 and caught in 27.

Figure 6:
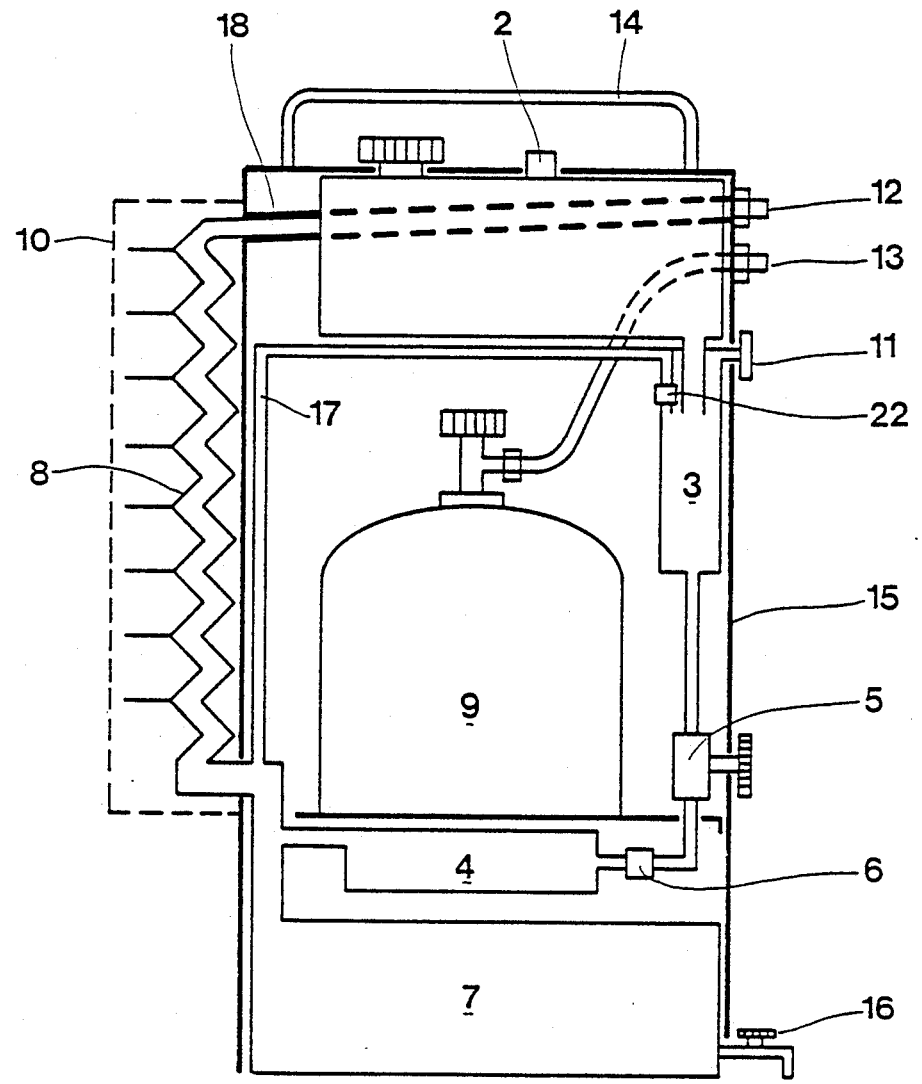
FIGS. 6 and 7 illustrate sideviews of embodiments of the apparatus that include tanks to contain pressurized gaseous fuel.
Figure 7:
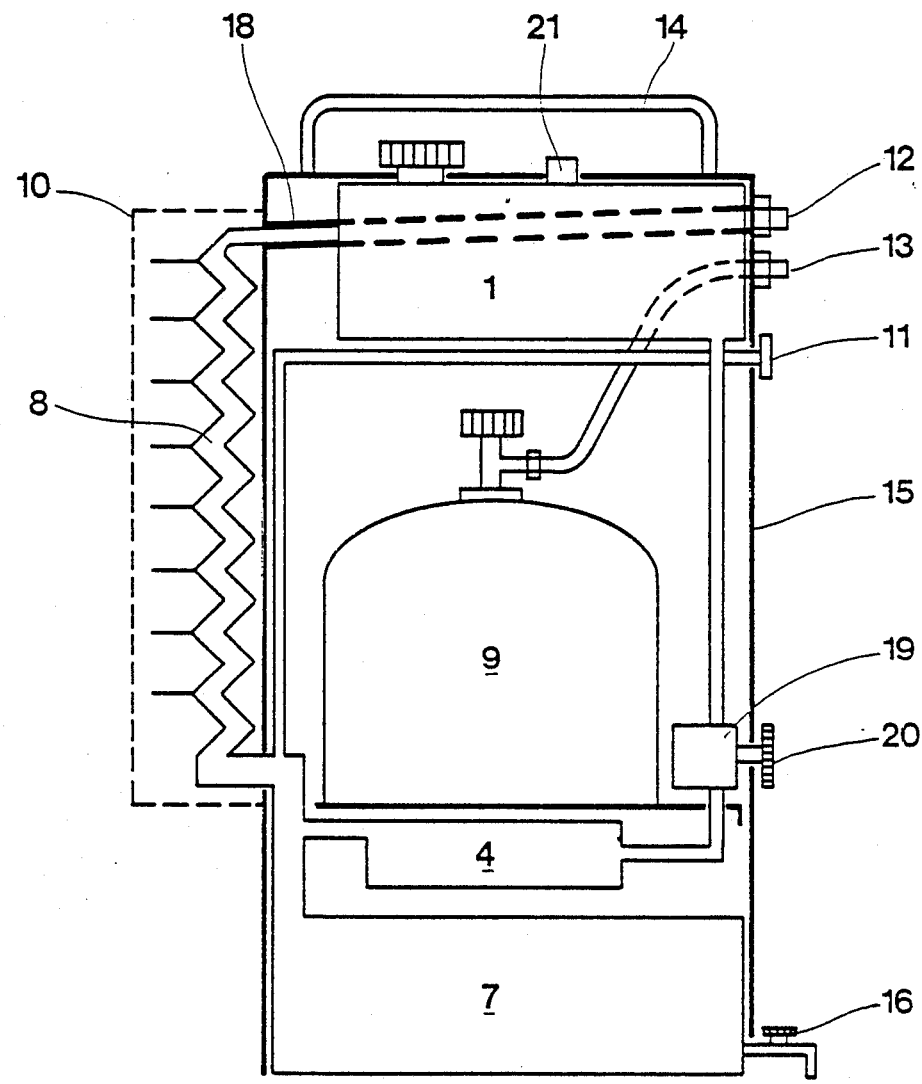

If the process according to the invention is used to generate oxygen for welding sets, it is possible to use sets of equipment such as those shown in FIGS. 6 and 7 which represent different ways of constructing a portable supply set for welding by means of an oxygen/combustible gas flame.

FIG. 6 represents a supply set in which oxygen is generated according to the scheme shown in FIG. 1. In this appliance, the combustible gas originates from cylinder 9 and leaves at 13. This supply set is particularly advantageous because it is completely self-contained.

FIG. 7 represents a similar supply set in which oxygen is generated according to the scheme shown in FIG. 2.

In order to illustrate the invention, some examples of carrying out the process according to the invention (examples 2 to 4) and a comparative example (example 1) are given below.

EXAMPLE 1

The test was carried out in a small commercial appliance very similar to the one described in FIGS. 2 and 3 of European Patent Application EP-A-No. 0 007 118 mentioned above except that the top of the storage tank for the aqueous solution of hydrogen peroxide was not connected to the bottle of liquified gas (butane) 9 but to the outlet of the gaseous oxygen via line 12.

A commercial aqueous solution of 35% hydrogen peroxide was used. The reactor made of aluminium had a volume of approx. 40 cm$^3$ and contained, as a catalyst, 150 g of milled lead bars (Pb content 99.5%) 13 to 15 cm in length, 3 mm wide and 1 mm thick.

The aqueous solution of hydrogen peroxide was introduced into the reactor continuously for 45 minutes and the flow rate of oxygen produced was measured over time. After 5 minutes' operation, this flow rate was 240 l.h$^{-1}$ whereas after 45 minutes it had to fallen 150 l.h$^{-1}$ which is not enough to produce a flame sufficiently hot for welding, the minimum flow to provide a flame with a satisfactory temperature being 180 l.h$^{-1}$.

EXAMPLE 2

The test was carried out in an appliance such as the one shown in FIG. 1. The constant level of the intermediate tank (3) was situated 25 cm from the level of the entrance to the reactor.

The same aqueous solution of hydrogen peroxide as in example 1 was used. The reactor (4) with a volume of about 40 cm$^3$ contained, as a catalyst, 150 g of milled lead bars such as those used in example 1.

The aqueous solution of hydrogen peroxide was introduced continuously into the reactor (4) for 24 minutes and the flow of oxygen produced was measured over time. After 7 minutes' operation, this flow rate was 360 1.h$^{-1}$. After 24 minutes it was 360 1.h$^{-1}$. There was therefore no appreciable change in the flow rate over time.

EXAMPLE 3

The test was carried out in an appliance such as the one shown in FIG. 2. A MASTERFLEX pump (19) providing a pressure of 180 mm Hg was used.

The same aqueous solution of hydrogen peroxide as in examples 1 and 2, the same reactor (4) and the same catalyst were used.

The aqueous solution of hydrogen peroxide was introduced continuously into the reactor (4) for 25 minutes and the flow of oxygen produced was measured over time. The difference in pressure between the entrance and the outlet of the reactor was kept at $8.10^{-4}$ MPa. After 5 minutes' operation, this flow rate was 250 1.h$^{-1}$. After 25 minutes, it was 225 1.h$^{-1}$. There was therefore no appreciable change in the flow rate over time.

A slight colouring of the waste water removed at (16) was observed over time.

EXAMPLE 4

The same appliance as in example 3 and similar operating conditions were used. Only the catalyst was replaced by granules of alumina impregnated with 1% platinum. These granules which take the form of spheres with a mean diameter of 7 mm are sold by Johnson Matthey and Co. Ltd.

After 5 minutes' operation, the flow rate of oxygen was 240 1.h$^{-1}$ and after 25 minutes it was still 240 1.h$^{-1}$. There was therefore no appreciable change in the flow rate over time.

The waste water did not contain any catalytic residue.

We claim:

1. A continuous process for the production of a gaseous product by reaction of a liquid reagent, the process comprising:
   introducing the liquid reagent continuously into a reactor having an inlet and an outlet in order to obtain a gaseous product and a liquid product, wherein a positive difference exists between the pressure at the inlet to the reactor and the pressure at the outlet of the reactor, which positive difference is kept constant.

2. A process according to claim 1, wherein the reactor contains solid particles of catalyst.

3. A process according to claim 1, wherein the difference in pressure ranges from 0.0001 to 0.01 MPa.

4. The process according to claim 1 applied to the production of oxygen by catalytic decomposition of hydrogen peroxide, wherein the liquid reagent is an aqueous solution of hydrogen peroxide, the reactor contains a decomposition catalyst for hydrogen peroxide having the form of solid particles, and wherein the gaseous product is a gaseous mixture containing oxygen and water, and the process comprises the further steps of
   cooling the gaseous mixture in a condensation zone to form a gaseous phase consisting essentially of oxygen and a liquid phase comprising water; and
   removing the liquid phase, wherein the positive difference between the pressure of the aqueous solution of hydrogen peroxide at the inlet to the reactor and the pressure of the gaseous phase consisting essentially of oxygen in the condensation zone at the outlet of the reactor is kept constant.

5. A process according to claim 4, wherein an aqueous solution containing from 15 to 65% by weight hydrogen peroxide is used.

6. A process according to claim 4, wherein the solid particles of catalyst contain a catalytic element chosen from among lead, platinum and palladium.

7. A process according to claim 6, wherein the catalyst is composed of platinum on an alumina support.

8. A process according to claim 2, wherein the reactor comprises in its upper part a zone which is not submerged and is free from catalyst.

9. A continuous process for the production of a gaseous product by reaction of a liquid reagent, the process comprising:
   introducing the liquid reagent from a storage tank continuously into a horizontal reactor having an inlet and an outlet in order to obtain a gaseous product and a liquid product, wherein the storage tank is positioned above the horizontal reactor and a positive difference exists between the pressure at the inlet to the reactor and the pressure at the outlet of the reactor, which positive difference is kept constant.

10. The process according to claim 9, wherein the horizontal reactor contains solid particles of catalyst.

11. The process according to claim 10, wherein the horizontal reactor comprises in its upper part a zone which is not submerged and is free from catalyst.

12. The process according to claim 9, wherein the difference in pressure ranges from 0.0001 to 0.01 MPa.

13. The process according to claim 9 applied to the production of oxygen by catalytic decomposition of hydrogen peroxide, wherein the liquid reagent is an aqueous solution of hydrogen peroxide, the horizontal reactor contains a decomposition catalyst for hydrogen peroxide having the form of solid particles, and the gaseous product is a gaseous mixture containing oxygen and water, and the process comprises the further steps of
   cooling the gaseous mixture in a condensation zone to form a gaseous phase consisting essentially of oxygen and a liquid phase comprising water; and
   removing the liquid phase, wherein the positive difference between the pressure of the aqueous solution of hydrogen peroxide at the entrance to the horizontal reactor and the pressure of the gaseous phase consisting essentially of oxygen in the condensation zone at the outlet of the horizontal reactor is kept constant.

14. The process according to claim 12, wherein an aqueous solution containing from 15 to 65% by weight hydrogen peroxide is used.

15. The process according to claim 12, wherein the solid particles of catalyst contain a catalytic element chosen from among lead, platinum and palladium.

16. The process according to claim 15, wherein the catalyst is composed of platinum on an alumina support.

* * * * *